Aug. 29, 1939.  W. J. WILKINSON  2,170,883
PHOTOGRAPHIC MASKING
Filed March 7, 1938
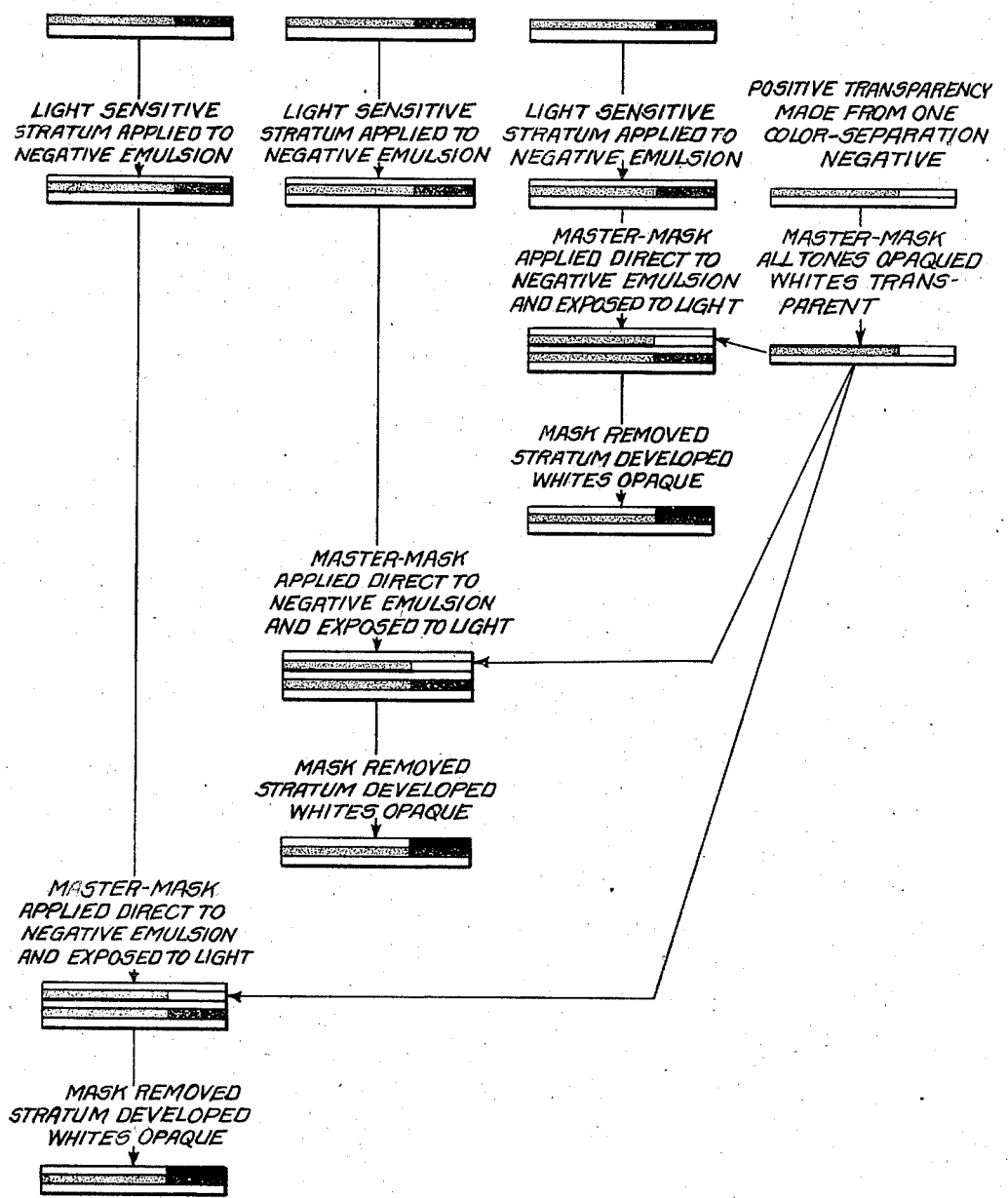

Patented Aug. 29, 1939

2,170,883

UNITED STATES PATENT OFFICE 2,170,883

PHOTOGRAPHIC MASKING

William J. Wilkinson, Eastchester, N. Y., assignor to Miehle Printing Press and Manufacturing Company, Chicago, Ill., a corporation of Illinois Application March 7, 1938, Serial No. 194,521

3 Claims. (Cl. 95—2)

The current invention pertains to certain novel betterments in the masking methods used by the contact process of making corrected transparencies for half-tone, offset and gravure printing.

I have heretofore invented a mask manner of eliminating tones from the backgrounds of all three or four color-separation negatives for the purpose of producing pure whites in the final prints, as set forth in my pending patent application Serial No. 1487, filed January 12, 1935.

The procedure presented in such patent application involves the production of a set of color-separation negatives, usually three or four depending upon the nature of the subject, representing the individual colors required conjointly to reproduce the original subject, the making of a positive from one of said negatives, the manual opaquing on said positive of all tones other than white leaving the areas representing the whites transparent, the making from such opaqued positive mask of a master block-out or mask negative in which the areas representing the whites are opaque and all other areas are transparent, the superimposing of said master blockout negative or mask in turn on, and in register with, each of the color-separation negatives, and the making of a set of white-corrected, color-separation, screened positives by light transmitted through each of said negatives in turn and a half-tone or other suitable screen, each of such negatives having said master-mask in register therewith during the masking of its corresponding positive.

Such negative mask heretofore employed was placed on the glass side of the negative and then used again in the same manner for the next negative, until it had been applied to all of the negatives to be employed in the production of their positives.

In such use, the mask was positioned in register with the negatives by the use of the existing register-marks, but because of the fact that this has been done on the glass side of the negatives, the thickness of the glass has prevented an absolutely accurate and precise registration.

I have now found, as illustrated in the accompanying drawing, that each of these negatives can first be coated with collodion directly over its emulsion which makes the latter waterproof and then coated over the collodion layer with a bichromated-glue solution, which after drying, is exposed to light through the painted-in or opaqued positive mask.

In some instances, it may not be necessary or desirable to use the preliminary waterproof collodion coating.

Again, instead of the specified bichromated-glue stratum, it is feasible and desirable, in some instances, to coat the negative stratum directly with a light-sensitive collodion emulsion.

Reverting now to the use of the bichromated-glue stratum, each such plate, after having been exposed through the specified corrective mask, is developed in the usual way by water and dyed in methyl violet solution in the same manner as a copper print for photo-engraving is dyed, which permits the extent of development to be made apparent but which does not modify the light-transmitting properties of the negative.

After having been thus dyed, each such negative is coated with a saturated solution of iodine and potassium bromide, which turns the film, where it has been exposed to light, a deep brown color and makes such portions photographically opaque.

All of these operations are performed on the gelatin side of each negative and hence each mask is in more perfect register and sharper than has heretofore been customary, the mask not being objectionable to the making of a contact positive for the reason that the thinness of the mask-coating so obtained does not interfere with the proper dot formation.

This mask may be used alone on the negative, or a suitable color-corrective film overlay may be applied to the negative over the mask, or the overlay may be applied to the negative and the mask provided over the overlay, and a waterproof collodion coating may be used between any two or all of the strata.

It should be understood, however, that in case the overlay or mask is applied directly to the gelatin negative, or to one another without such intervening collodion stratum, subsequent removal of the superposed corrective positive or mask would probably be precluded.

From what precedes, it will be clear that the single, opaqued, positive master-mask made from one color-separation negative of a set of such negatives is used to provide all of the negatives with their individual masks.

When a light-sensitive collodion emulsion is applied over each of the color-separation negatives, instead of the bichromated-glue solution, and in turn exposed to the opaqued positive mask or shield made from one of such negatives, the exposed strata are developed and fixed in the usual way, and of course, they require no dying or subsequent treatment because the development itself renders the proper parts of the mask opaque.

The present invention, as defined by the following claims, is susceptible of the incorporation of changes in the procedure and in the results produced, all without departure from the underlying principles on which the invention is based and without the sacrifice of any of its material advantages.

This patent is a continuation in part of, my earlier pending patent application Serial No. 79,173, filed May 11, 1936, matured into Patent No. 2,124,679, of July 26, 1938.

I claim:

1. In the process of masking a set of color-separation negatives of a subject, the steps of making a positive-transparency from one of said color-separation negatives, opaquing all tone portions of said positive-transparency leaving all whites transparent thereby providing an opaqued master-mask, coating the emulsions of a plurality of said color-separation negatives each with a light-sensitive stratum, registering said master-mask on said strata in turn and while so registered exposing the corresponding stratum to light through said master-mask, and developing and rendering the exposed parts of said strata opaque, whereby each such treated color-separation negative has its own individual mask affixed to its emulsion in proper register.

2. The process set forth in claim 1 in which said light-sensitive strata are bichromated-glue.

3. The process set forth in claim 1 in which said strata are light-sensitive collodion emulsions.

WILLIAM J. WILKINSON.